US010754353B2

United States Patent
Sporrer et al.

(10) Patent No.: US 10,754,353 B2
(45) Date of Patent: Aug. 25, 2020

(54) IMPLEMENT DETECTION AND CONTROL SYSTEM

(71) Applicant: Deere & Company, Moline, IL (US)

(72) Inventors: Adam D. Sporrer, Huxley, IA (US);
Lucas B. Larsen, Ankeny, IA (US);
Ricky B. Theilen, Bettendorf, IA (US);
Jeremy D. Krantz, Polk City, IA (US)

(73) Assignee: Deere & Company, Moline, IL (US)

( * ) Notice: Subject to any disclaimer, the term of this patent is extended or adjusted under 35 U.S.C. 154(b) by 143 days.

(21) Appl. No.: 15/898,846

(22) Filed: Feb. 19, 2018

(65) Prior Publication Data
US 2019/0258271 A1  Aug. 22, 2019

(51) Int. Cl.
| G05D 1/02 | (2020.01) |
| A01B 59/00 | (2006.01) |
| A01B 59/06 | (2006.01) |
| A01B 61/04 | (2006.01) |
| A01B 76/00 | (2006.01) |
| A01B 59/04 | (2006.01) |

(52) U.S. Cl.
CPC ......... *G05D 1/0295* (2013.01); *A01B 59/002* (2013.01); *A01B 59/065* (2013.01); *A01B 61/04* (2013.01); *A01B 76/00* (2013.01); *G05D 1/0238* (2013.01); *A01B 59/04* (2013.01); *G05D 2201/0201* (2013.01)

(58) Field of Classification Search
None
See application file for complete search history.

(56) References Cited

U.S. PATENT DOCUMENTS

| 6,041,271 | A | * | 3/2000 | Lindstrom | ......... G05B 19/4065 |
| | | | | | 700/175 |
| 6,778,894 | B2 | | 8/2004 | Beck et al. | |
| 7,973,654 | B2 | | 7/2011 | Ehrhart et al. | |
| 8,411,930 | B2 | | 4/2013 | Ridley et al. | |
| 8,478,480 | B2 | * | 7/2013 | Mian | ................... G01M 17/013 |
| | | | | | 250/316.1 |
| 8,649,932 | B2 | * | 2/2014 | Mian | ................... G01M 17/013 |
| | | | | | 250/316.1 |
| 9,604,514 | B2 | | 3/2017 | Vonroth | |
| 2002/0107624 | A1 | | 8/2002 | Rutz | |
| 2002/0116107 | A1 | | 8/2002 | Mahoney et al. | |

(Continued)

FOREIGN PATENT DOCUMENTS

| EP | 1769949 A1 | 4/2007 |
| JP | 2004267012 A | 9/2004 |
| WO | 2016144795 A1 | 9/2016 |

OTHER PUBLICATIONS

EP Patent Application No. 19152396.8 Extended Search Report dated Jul. 17, 2019, 10 pages.

*Primary Examiner* — Thomas G Black
*Assistant Examiner* — Demetra R Smith-Stewart
(74) *Attorney, Agent, or Firm* — Joseph R. Kelly; Kelly, Holt & Christenson, PLLC

(57) ABSTRACT

One or more sensors identify a characteristic of a towed implement using non-visual electromagnetic radiation, auditory detection or temperature detection. The characteristic of the implement is compared to a reference characteristic to determine whether the implement has a problem. If so, control signals are generated to control a controllable subsystem based upon the identified problem.

20 Claims, 10 Drawing Sheets

(56) References Cited

U.S. PATENT DOCUMENTS

| | | | |
|---|---|---|---|
| 2009/0018721 A1* | 1/2009 | Mian | G01M 17/013 |
| | | | 701/31.4 |
| 2013/0268155 A1* | 10/2013 | Mian | G01M 17/013 |
| | | | 701/29.6 |
| 2014/0148808 A1* | 5/2014 | Inkpen | G01B 7/003 |
| | | | 606/80 |
| 2015/0105965 A1 | 4/2015 | Blackwell et al. | |
| 2015/0240453 A1* | 8/2015 | Jaliwala | E02F 9/2041 |
| | | | 701/50 |
| 2016/0157413 A1 | 6/2016 | Kowalchuk et al. | |
| 2018/0027725 A1 | 2/2018 | Koutsorodi et al. | |
| 2019/0223379 A1* | 7/2019 | Gilmore | A01D 41/127 |

* cited by examiner

US 10,754,353 B2

IMPLEMENT DETECTION AND CONTROL SYSTEM

FIELD OF THE DESCRIPTION

The present description relates to a towed agricultural implement. More specifically, the present description relates to identifying problems with a towed implement, and performing control operations based upon the problem.

BACKGROUND

There are many different types of agricultural machines. The agricultural machines include a variety of different towed implements. The towed implements can include such things as tillage equipment, planting equipment, sprayers or other application implements, bailers, among a wide variety of others. Currently, the health of the towed implement can be difficult to detect by an operator of a towing vehicle (such as the operator of a tractor). For instance, if parts on the towed implement are lost, broken, damaged or loosened, or where their proper function is otherwise impaired in some other way, this may not be detectable by the operator unless it is observed by the operator. The operator may need to dismount the towing vehicle and perform a visual inspection of the implement in order to identify some lost, broken, loose, or otherwise compromised portions of the implement.

Detecting a compromised portion of an implement can be even more difficult under some circumstances. For instance, tillage equipment often has multiple rows of ground engaging components. The size of the implement, in itself, can make it difficult for an operator to observe a problem with the implement. Further, during operation, the implement may be engaged with the soil over which it is traveling. This can even further obscure the operator's view of the implement so the observation of problems can even be more difficult.

Because it is difficult to detect problems with a towed implement, the operation of the towed implement can be compromised. For instance, because an operator often only finds a problem by visual inspection, this can mean that the towed implement is operating for a period of time, even while it has a problem. This can lead to degraded performance of the implement, and it can also, at times, result in additional damage to the implement.

The discussion above is merely provided for general background information and is not intended to be used as an aid in determining the scope of the claimed subject matter.

SUMMARY

One or more sensors identify a characteristic of a towed implement using non-visual electromagnetic radiation, auditory detection or temperature detection. The characteristic of the implement is compared to a reference characteristic to determine whether the implement has a problem. If so, the problem is identified and control signals are generated to control a controllable subsystem based upon the identified problem.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
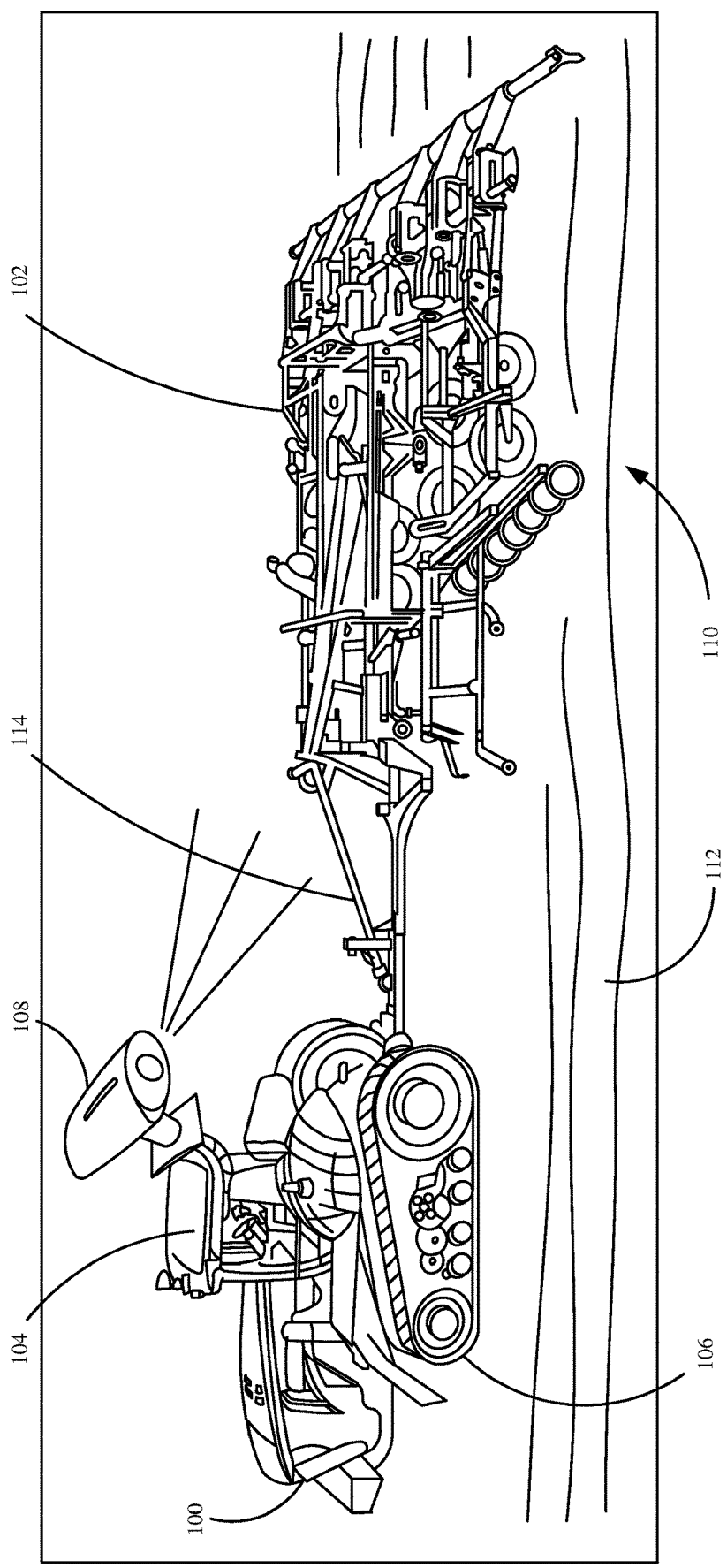
FIG. 1 is a pictorial illustration of one example of a towing vehicle and towed agricultural implement.

There are a wide variety of different types of towing vehicles and towed agricultural implements. FIG. 1 is a pictorial illustration showing one example of a towing vehicle 100 and a towed agricultural implement 102. In the example shown in FIG. 1, towing vehicle 100 is a tractor having an operator's compartment 104 and a set of ground engaging elements (e.g., tracks) 106. Towed vehicle 104 also has a set of characteristic sensors 108 that sense one or more characteristics of towed implement 102. In the example shown in FIG. 1, towed implement 102 is illustratively a tillage implement. Therefore, it has a plurality of rows of ground engaging elements 110 that engage the soil in field 112 over which implement 102 is being towed. Towing vehicle 100 is attached to towed implement 102 by one or more links 114.

It can thus be seen that it may be difficult for an operator in operator's compartment 104 to identify problems with any of the functional items of towed implement 102 (such as the frame, ground engaging elements 110, wheels, bearings, or any other item that performs any function on implement 102). This can be especially true with respect to the ground engaging elements 110, because the operator's view can be obscured while elements 110 are engaged with the soil in field 112.

Therefore, in one example, one or more sensors 108 sense a characteristic of implement 102 and compare it to a reference value for that characteristic to determine whether there are any problems with towed implement 102. For example, and as is described in greater detail below, the sensors 108 can include non-visual electromagnetic characteristic sensors, auditory characteristic sensors, temperature characteristic sensors, among others. They sense the particular characteristics of towed implement 102 and can compare them against a baseline characteristic (or other reference characteristic) for towed implement 102. If the currently sensed characteristic deviates from the baseline characteristic, then this may indicate a problem with towed implement 102. In another example, the sensed characteristics may be compared against a threshold value. In another example, sensed characteristics from one group of elements 110 may be compared against similar characteristics sensed (in real time or near real time) from another group of elements 110. If they deviate from one another by a threshold amount, then this may also indicate a problem.

It should also be noted that the present description proceeds with respect to sensors 108 being mounted on towing vehicle 100. This is described for the sake of example only. This need not be the case. Instead, sensor 108 (or other portions of the system) may be disposed on an unmanned aerial vehicle, or another item, which can generate the sensor signals, when needed. Similarly, the sensors 108, or other portions of the system, may be disposed on towed implement 102 where they communicate with a control system on towing vehicle 100. All of these are examples, and other architectures are contemplated herein as well.

Figure 2:
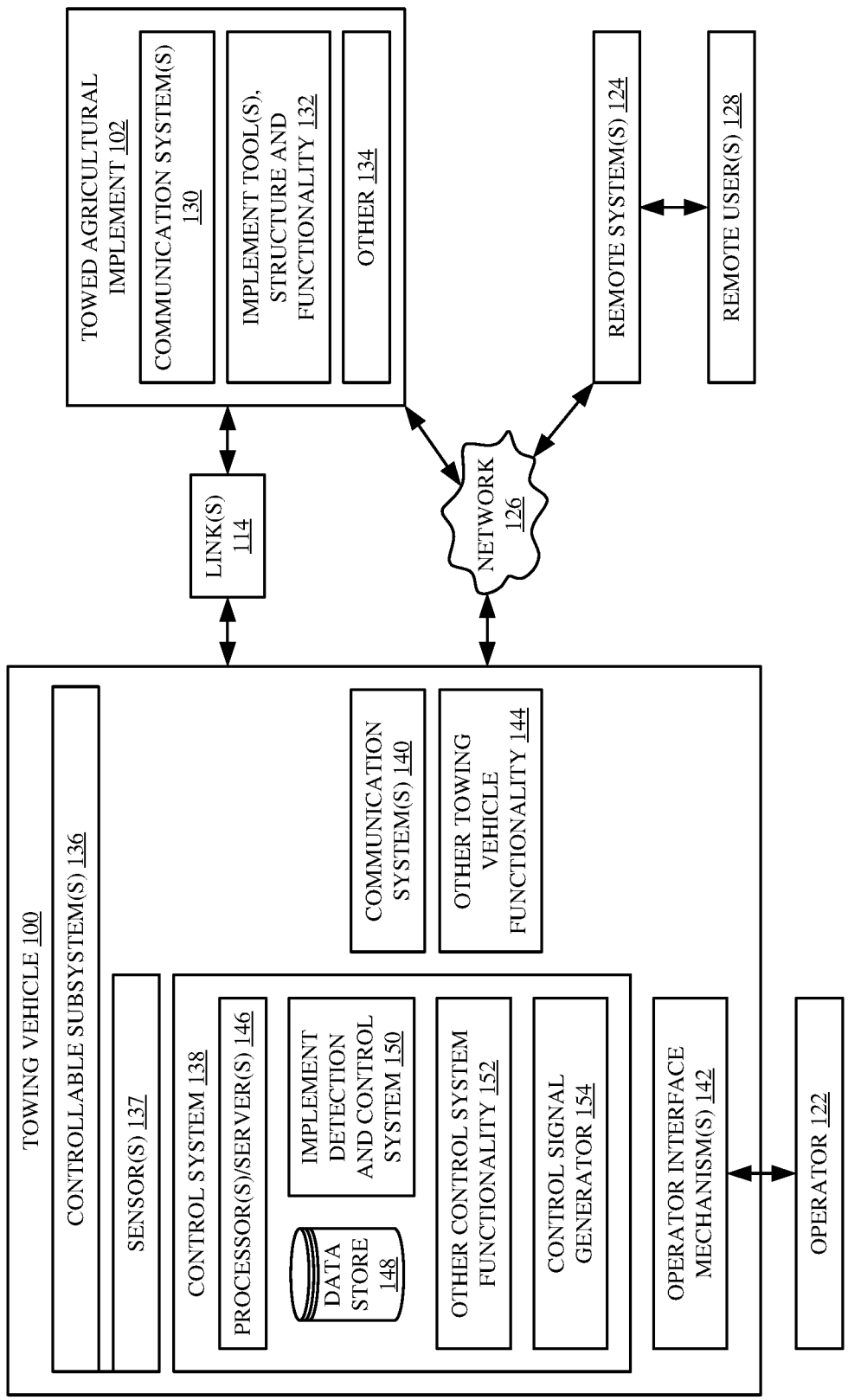
FIG. 2 is a block diagram of a towed implement architecture showing one example of a towing vehicle and towed agricultural implement, in more detail.

FIG. 2 is a block diagram showing one example of a towed implement architecture 120. Architecture 120 shows towing vehicle 100 and towed implement 102 connected by one or more links 114. FIG. 2 also shows that, in one example, operator 122 operates towing vehicle 100. In doing so, operator 122 can provide inputs to control vehicle 100 and towed agricultural implement 102.

FIG. 2 also shows that, in one example, items on towing vehicle 100 and/or towed agricultural implement 102 can be configured to communicate with one or more remote systems 124 over a network 126. Remote systems 124 can be accessed by one or more remote users 128. In one example, remote systems 124 can include online services or websites, a data center, another type of remote storage system, or other remote computing systems or communication systems. Therefore, in one example, network 126 can include a wide area network, a local area network, a near field communication network, a cellular communication network, or any of a wide variety of other networks or combinations of networks.

Before describing the overall operation of architecture 120 in more detail, a brief description of some of the items in architecture 120 and their operation will first be provided.

In the example shown in FIG. 2, towed agricultural implement 102 illustratively includes one or more communication systems 130, implement tools, structure and functionality 132. This can, for instance, include ground engaging elements 110, actuators, and the frame of implement 102. Implement 102 can include other items 134.

The tools, structure and functionality 132 will vary widely based upon the type of towed agricultural implement 102 that is being used. In the example described herein, it can include any functional item on implement 102 such as the frame of implement 102 as well as the ground engaging tools or elements 110, the wheels, bearings, and any other items on implement 102. However, if implement 102 was a different type of implement, such as a planter, a seeder, a bailer, a sprayer, or another type of towed implement, the particular implement tools, structure and functionality 132 would vary accordingly.

Also, in the example shown in FIG. 2, towing vehicle 100 includes one or more controllable subsystems 136, sensors 137, control system 138, one or more communication systems 140, operator interface mechanisms 142 and it can include a wide variety of other towing vehicle functionality 144. Control system 138 illustratively includes one or more processors or servers 146, data store 148, implement detection and control system 150, other control system functionality 152, and control signal generator 154.

Controllable subsystems 136 can include a wide variety of subsystems, such as a propulsion and steering subsystem, a traction control subsystem, hydraulic and electric subsystems, among a wide variety of other subsystems.

Sensors 137 can also include a wide variety of different sensors. For instance, they can include a position sensor (such as a GPS receiver or another geographic position sensor), vehicle operating parameter sensors (such as one or more engine sensors, a speed sensor, and a wide variety of other operating parameter sensors) and they can include other sensors as well.

Operator interface mechanisms 142 can include a wide variety of different types of operator interface mechanisms that can be used to interface with operator 122. For instance, they can include a steering wheel, joystick, pedals, levers, linkages, buttons, switches, a visual interface, a haptic interface, an audible interface, among a wide variety of others. In addition, the user interface mechanisms 142 can be displayed on a display device. Therefore, they can include user actuatable items such as icons, buttons, links, etc. Further, when the display device is a touch sensitive screen, the user interface mechanisms can be actuated by touch. Also, when vehicle 100 includes a speech recognition system, the user interface mechanisms 142 can include a microphone so that operator 122 can provide control inputs using speech. Therefore, operator 122 illustratively interacts through operator interface mechanisms 142 to control and manipulate towing vehicle 100 and portions of towed agricultural implement 102.

Communication systems 140 illustratively allow towing vehicle 100 to communicate with towed agricultural implement 102 over links 114. Links 114 can be wired or wireless links, a hydraulic link for providing hydraulic control of implement 102, one or more mechanical links, mechanical power links (such as a power takeoff), among a wide variety of other things. Communication systems 140 also illustratively allow towing vehicle 100 to communicate with remote systems 124 over network 126. Therefore, communication systems 140 are configured to communicate over whatever type of network is used to form network 126. They can thus include a cellular communication system, a local or wide area network communication system, nearfield communication systems, and/or others.

Control system 138 illustratively receives inputs from sensors 137 and it can receive inputs from operator 122 through operator interface mechanisms 142, and further through communication systems 140 and illustratively generates control signals to control the controllable subsystems 136 in order to control the operation of towing vehicle 100. Also, in one example, control system 138 can receive such inputs and generate control signals to control portions of towed agricultural implement 102. By way of example, it may be that the implement tools, structure and functionality 132 include hydraulic actuators that lift ground engaging elements 110 out of the ground. It may be that other actuators are provided to change the angle of the ground engaging elements 110, or to perform any of a wide variety of other operations on towed agricultural implement 102. In that case, control system 138 illustratively generates control systems which can be provided over one or more of links 114 in order to control the operations of towed agricultural implement 102.

Implement detection and control system 150 illustratively detects various characteristics of towed implement 102 in order to determine whether towed implement 102 has any problems. In one example, system 150 can detect non-visual electromagnetic characteristics of implement 102, auditory characteristics of implement 102, temperature characteristics, or other characteristics of implement 102, and compare them to reference values in order to determine whether those characteristics are within an expected of the reference value, or whether they deviate from the expected range. If they deviate from the expected range, then this may indicate a problem. In that case, control signal generator 154 illustratively generates control signals (or action signals) to control other items of towing vehicle 100 or towed agricultural implement 102, or to take other action in response to any identified problems.

Figure 3:
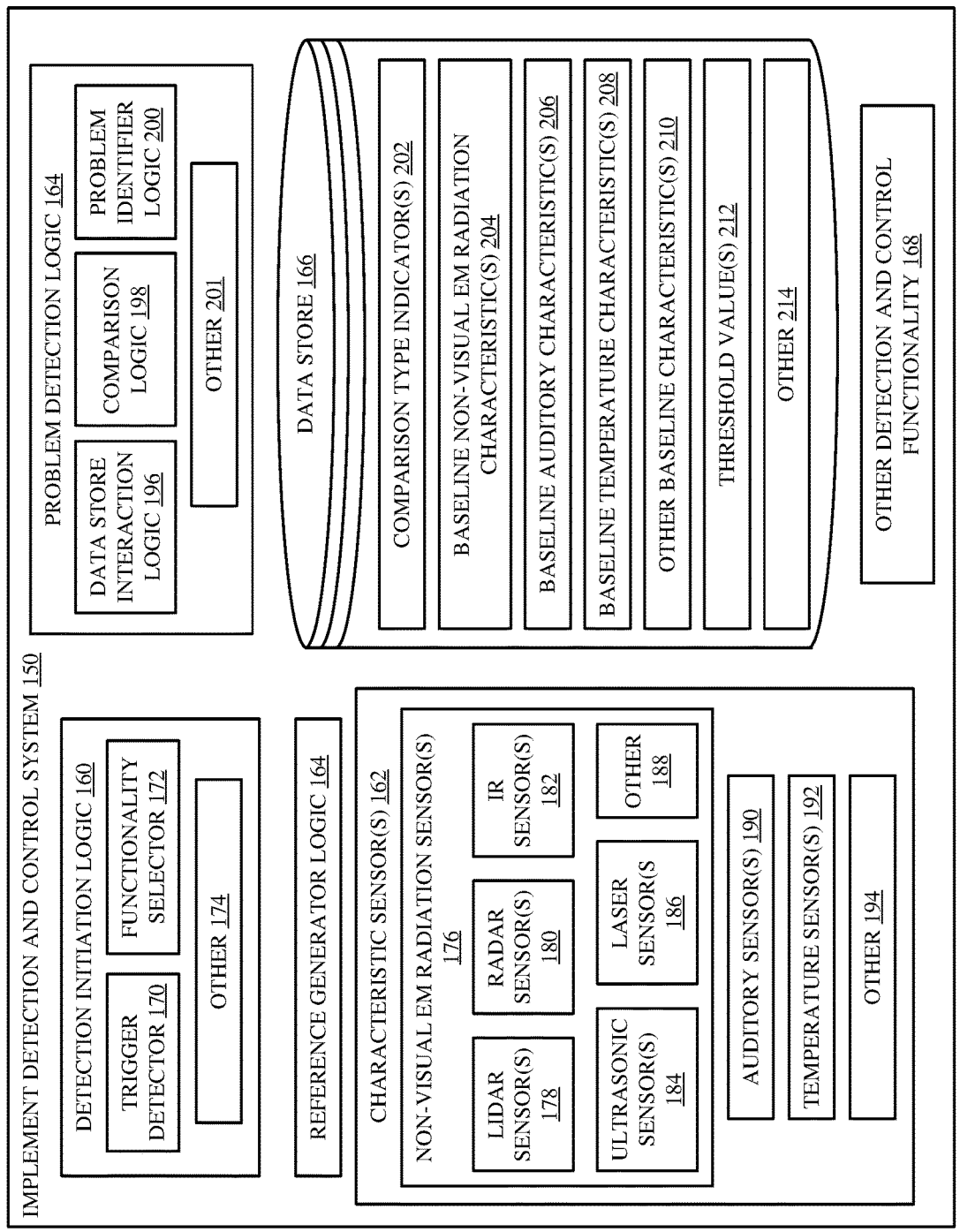
FIG. 3 is a block diagram showing one example of an implement detection and control system in more detail.

FIG. 3 is a block diagram showing one example of implement detection and control system 150, in more detail. Implement detection and control system 150 illustratively includes detection initiation logic 160, reference generation logic 161, characteristic sensors 162, problem detection logic 164, data store 166, and it can include a wide variety of other detection and control functionality 168. Detection initiation logic 160, itself, illustratively includes trigger detector 170, functionality selector 172, and it can include other items 174. Characteristic sensors 162 can include one or more non-visual electromagnetic (EM) radiation sensors 176. Such sensors can include, for example, LIDAR sensors 178, radar sensors 180, infrared (IR) sensors 182, ultrasonic sensors 184, laser sensors 186, and they can include a wide variety of other sensors that sense electromagnetic radiation in the non-visual frequency range, as indicated by block 188. Sensors 162 can also include auditory sensors 190, temperature sensors 192, and other sensors 194.

Problem detection logic 164 illustratively includes data store interaction logic 196, comparison logic 198, problem identifier logic 200, and it can include other items 202. Data store 166 can include comparison type indicators 202, baseline non-visual EM radiation characteristics 204, baseline auditory characteristics 206, baseline temperature characteristics 208, other baseline characteristics 210, threshold values 212, and it can include other items 214. Before describing the operation of implement detection and control system 150 in more detail, a brief description of some of the items in system 150, and their operation, will first be provided.

Detection initiation logic 160 illustratively detects when implement detection and control system 150 is to perform a detection operation in an attempt to determine whether implement 102 has any problems. Therefore, trigger detector logic 170 can be configured to detect a wide variety of different types of triggers. In one example, trigger detector 170 can detect a trigger based upon a time out or other intermittent time period. For instance, the system 150 can check periodically, on predefined intervals, to determine whether implement 102 has a problem. It can also do it intermittently based on a wide variety of other triggers. For instance, if a sensed value changes quickly (such as moves by a threshold amount within a threshold time period), this may trigger system 150 to perform a detection operation. Trigger detector 170 may detect a trigger as a certain point during a certain operation. For instance, if implement 102 is a tillage implement and the ground engaging elements are raised out of the ground at headland turns, then when towing vehicle 100 begins making a headland turn, this may trigger system 150 to perform a detection operation with respect to the ground engaging elements. A wide variety of other triggers can be used as well.

Functionality selector 172 then selects the particular function on implement 102 that is detected. For instance, it may be that implement 102 has a motor with bearings, and ground engaging tools or elements. It may also be that system 150 determines whether each of those items have a problem, sequentially. In that case, functionality selector 172 selects one of those items of functionality for detection first, and then selects the other. It will be appreciated, however, that there may be only one set of functionality that needs to be checked, or multiple items of functionality that can be checked at the same time.

Once a detection operation is to be performed, then problem detection logic 164 controls characteristic sensors 162 to sense a characteristic of implement 102 that can be used for detection. Non-visual EM radiation sensors 176 thus detect a non-visual EM radiation characteristic corresponding to implement 102. For instance, it may be that LIDAR sensors 178, radar sensors 180, ultrasonic sensors 184 or laser sensors 186 are mounted in a rearward facing orientation on towing vehicle 100. They can sense return radiation based upon a signal emitted toward implement 102. The return signals may indicate the presence or absence of the ground engaging elements, and/or the configuration of various tools on implement 102 (such as whether those tools are present, whether they have been bent, or are broken, etc.). IR sensors 182 may sense an image of implement 102 using radiation in the infrared range. By way of example, IR sensors 182 may take a thermal image of implement 102. If a certain portion of implement 102 is heating up inordinately, this may indicate a problem, such as that a bearing is going out, there is a lack of lubricant flow to a certain area, or a wide variety of other problems.

Auditory sensors 190 can include a microphone, or microphone array, any type of directional or omnidirectional microphones, or other microphone, that picks up audio characteristics of implement 102, during its operation. For instance, it may be that implement 102 has bearings that emit a predictable auditory characteristic when they are becoming worn, or are past their useful life. Also, when implement 102 has ground engaging elements, and some of those elements are broken, bent or loose, the auditory characteristics of implement 102 may be different than when all of the ground engaging elements are present. A wide variety of other actuators or tools on implement 102 may exhibit different auditory characteristics when they are running properly, and when they are experiencing a problem. Those mentioned are mentioned for the sake of example only.

Temperature sensors 192 may be sensors that are disposed on elements of implement 102 and generate a temperature signal indicative of the temperate of those elements. In some examples, various components or elements of implement 102 may reach a nominal temperature value that remains essentially constant or steady during operation. If the temperature of a component begins to rise, with no other variables changing that would affect the temperature of that component, this may indicate a problem, such as component wear, or some other problem.

Data store interaction logic 196 then interacts with data store 166 (if needed) in order to obtain a value against which the sensed characteristic can be compared to identify a problem. It may be that, in order to identify a problem with a given set of functionality, two real time (or near real time) signals are compared against one another. For instance, if there are multiple working groups (e.g., multiple sets of similar tools) on implement 102, it may be that data store interaction logic 196 need not obtain any stored characteristics from data store 166. Instead, two real time (or near real time) characteristics from two different, but similar, working groups can be compared against one another to identify a problem.

However, if the functionality that is to be checked will be checked by comparing a sensed characteristic against a baseline characteristic, then logic 196 interacts with data store 166 to obtain the corresponding baseline characteristic for comparison. Similarly, if the sensed characteristic is to be compared against a threshold value, then the threshold value 212 can be obtained from data store 166 and used for comparison. The baseline characteristics or thresholds can be predefined or generated by reference generator logic 161.

Also, in one example, comparison indicators 202 can identify a type of comparison that is to be made for checking any particular functionality on implement 102. For instance, assume that implement 102 has a set of ground engaging tools or elements and also has a motor with various bearings. It may be that, when the tool functionality is to be checked, the sensed characteristic is a non-visual EM radiation characteristic that is to be compared against a baseline non-visual EM radiation characteristic 204. However, the bearings and the motor, may be checked by comparing an auditory characteristic generated by auditory sensors 190 against a baseline auditory characteristic 206, or an auditory threshold value 212. Thus, when data store interaction logic 196 obtains an indication of the type of functionality to be tested (such as from functionality selector 172), it can access comparison type indicators 202 in data store 166 to determine the types of comparisons that are to be made for the functionality being tested. It can then obtain the desired baseline value, or threshold value (if one of those are to be used) for comparison logic 198.

Once the reference value for comparison is identified (such as a baseline characteristic, real time (or near real time) sensor signal from another similar group on implement 102, etc.), and once the real time (or near real time) characteristics are obtained (from characteristic sensors 162), then comparison logic 198 compares the real time (or near real time) characteristic generated by characteristic sensors 162, for the functionality to be tested, against the reference value (e.g., against the baseline characteristic value, a threshold value, or against a near real time signal from another similar working group on implement 102). The results of the comparison are provided from comparison logic 198 to problem identifier logic 200.

Based on the results of the comparison, problem identifier logic 200 may determine that the functionality being tested is exhibiting a problem, or that it is not. If it is exhibiting a problem, then logic 200 may identify the particular problem for the functionality being tested. For instance, where a comparison is against a baseline characteristic, and the comparison shows that the real time characteristic sensed for the implement 102 differs from the baseline characteristic by a predetermined amount, and in a predetermined direction, this difference may be mapped to a particular problem, or set of problems, that may be causing the difference. In that case, problem identifier logic 200 identifies that problem or set of problems (based on the mapping) and outputs it to control signal generator logic 154 (shown in FIG. 2). Control signal generator logic 154 can then generate one or more action signals to control various controllable subsystems 136 and/or operator interface mechanisms 142 and/or communication systems 140 to alert operator 122 to the problem, to control implement 102 or towing vehicle 100 in order to address the problem, to communicate the existence of the problem to remote systems 124, and/or to provide a wide variety of other actions.

Figure 4A:
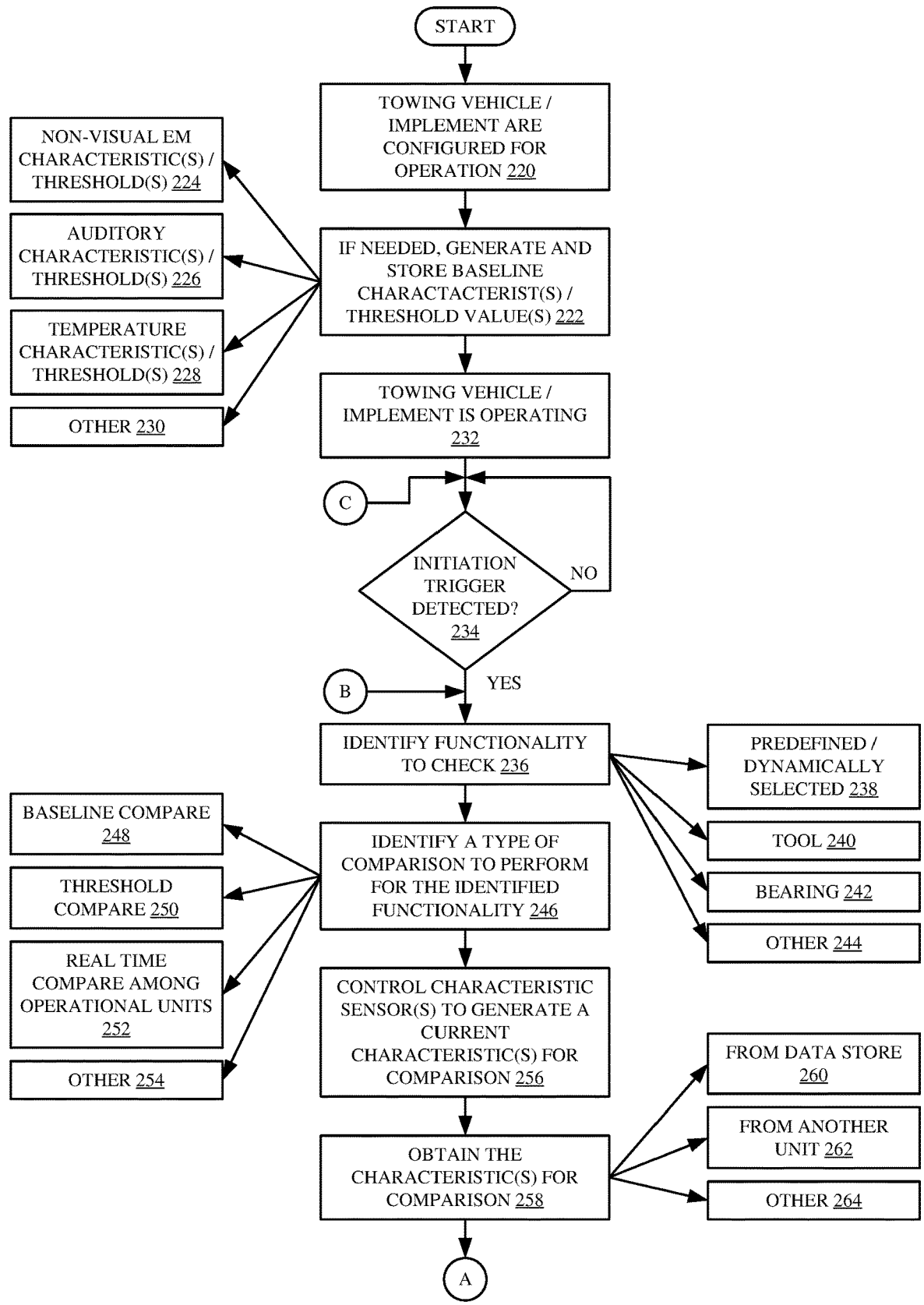
FIGS. 4A and 4B (collectively referred to herein as FIG. 4) illustrate a flow diagram showing one example of detecting a problem with the towed implement, and generating control signals.
Figure 4B:
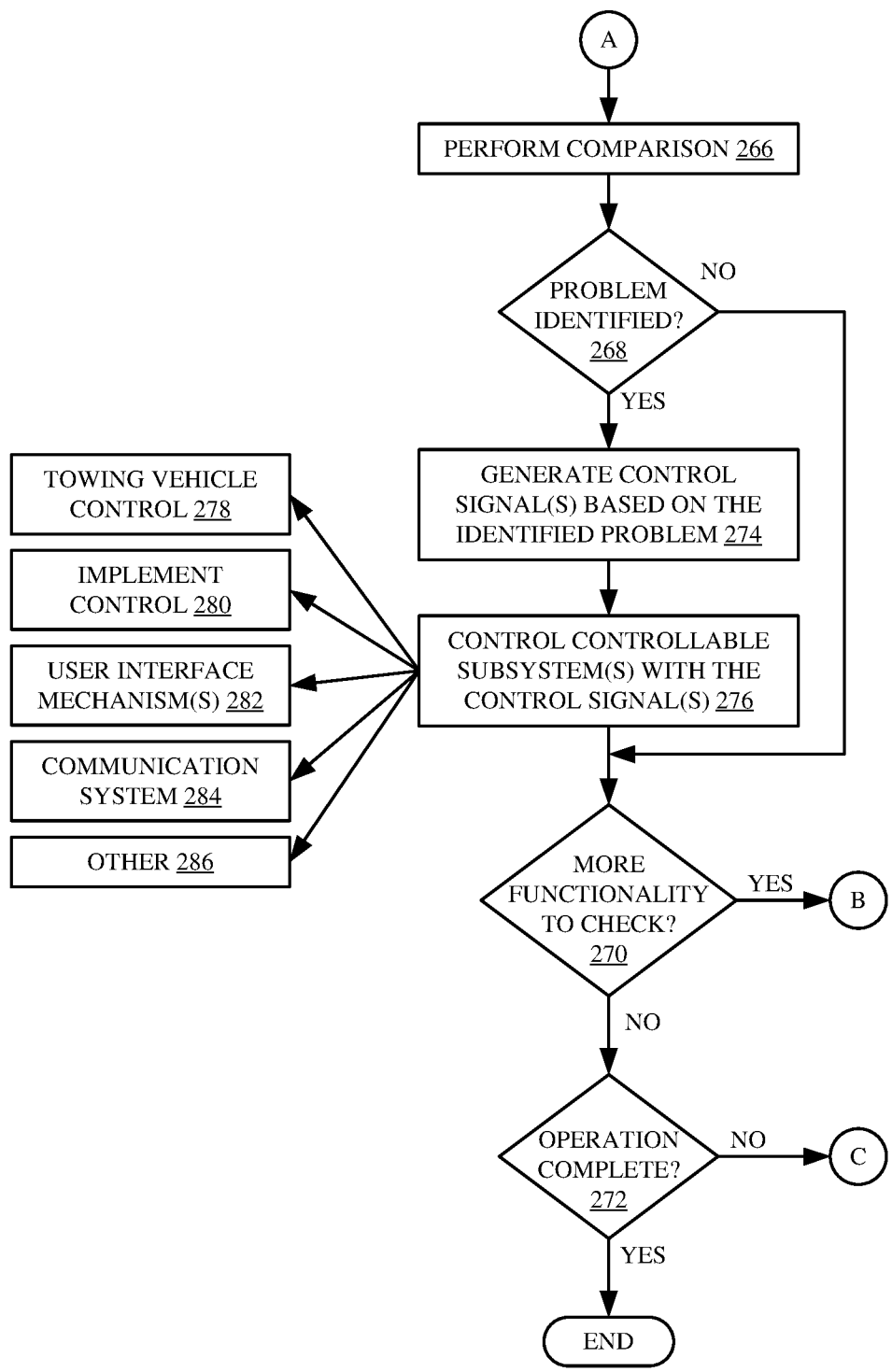

FIGS. 4A and 4B (collectively referred to herein as FIG. 4) show a flow diagram illustrating one example of the operation of implement detection and control system 150, and architecture 120, in more detail. It is first assumed that towing vehicle 100 and implement 102 are configured for performing an operation in a field. This is indicated by block 220 in the flow diagram of FIG. 4.

If needed, baseline generator logic 161 then generates one or more baseline characteristics 204, 206, 208, 210 that will be used for checking the functionality of implement 102 to identify whether it has a problem. It can also generate threshold values 212, where thresholds are to be used. This is indicated by block 222. In one example, if non-visual EM characteristics 204, or thresholds 212 are to be used, then baseline generator logic 161 identifies when towing vehicle 100 and implement 102 are in a position, or performing an operation, where the baseline characteristics can be generated.

For instance, if the non-visual EM sensors 176 need ground engaging elements of implement 102 to be out of engagement with the ground in order to identify the baseline characteristic, then baseline generator logic 161 determines when towing vehicle 100 is making a headland turn, so that those elements are out of engagement with the ground and can be more easily detected. It can do this by receiving a geographic position signal from one of sensors 137, by receiving an input signal indicating the operator has controlled implement 102 to lift it out of the ground, or in a wide variety of other ways. It then uses non-visual EM radiation sensors 176 to perform a detection operation in order to obtain the baseline value. The baseline value can be taken before the operation starts in the field as well, such as during a calibration or baseline establishing period where operator 122 is instructed to place the towing vehicle 100 and implement 102 in an appropriate position so that the baseline characteristics can be established. Establishing the non-visual EM characteristics or thresholds is indicated by block 224 in the flow diagram of FIG. 4.

When the baseline value is an auditory characteristic or threshold, then it may be that auditory sensors 190 perform a sensing operation during the operation of vehicle 100 and towed agricultural implement 102, in order to establish a baseline auditory characteristic or threshold. They can be established in other ways as well. Establishing the auditory characteristic baseline or threshold values is indicated by block 226 in the flow diagram of FIG. 4.

When baseline temperature characteristics 208 or temperature thresholds are to be obtained, then baseline generator logic 161 controls temperature sensors 192 to obtain temperature values during a period when the baseline characteristics can be established. For instance, if the baseline temperature characteristic is to be established during operation of implement 102 and vehicle 100, then baseline generator logic 161 controls temperature sensors 192 to provide the sensor signals in order to establish the baseline temperature characteristic 208 (or thresholds 212) during operation of vehicle 100 and implement 102. This is indicated by block 228 in the flow diagram of FIG. 4. The baseline characteristics and/or threshold values can be established in a wide variety of other ways as well, and this is indicated by block 230.

It will be noted that, in one example, some of the baseline characteristics or threshold values may vary with weather conditions, with machine configuration, with soil conditions, etc. Therefore, it may be that baseline generator logic 161 also includes a trigger detector to determine when new baseline characteristics or thresholds are to be established. For instance, if it detects that the temperature has suddenly dropped (e.g., perhaps when the sun goes down in the evening) and this will affect the baseline characteristics or threshold values, then this may trigger baseline generator logic 161 to control system 150 to establish new baseline characteristics and/or threshold values. It can be triggered to establish those characteristics or threshold values in other ways as well.

At some point, vehicle 100 and implement 102 began operating so that implement 102 needs to be checked for problems. Having the towing vehicle 100 and implement 102 in operation is indicated by block 232 in the flow diagram of FIG. 4. Trigger detector 170 then eventually detects a trigger indicating that a checking operation is to be performed. This is indicated by block 234. As mentioned above, the trigger can be detected based on a timeout period. Or system 150 may be continuously checking the various functionality of implement 102. The trigger detection can be based on a sensed value of an item on implement 102 suddenly changing by a threshold amount, or it can be based on in a wide variety of other criteria.

Once system 150 is to perform a check of implement 102, then functionality selector 172 identifies the functionality that is to be checked. This is indicated by block 236. In one example, the functionality to be checked for a given implement 102 is predefined, for that implement. In another example, when multiple items of functionality are to be checked sequentially, the order in which they are to be checked is predefined. In yet another example, the functionality to be checked can be dynamically chosen based on other criteria, such as what items of functionality typically have problems more often, or still other criteria. Identifying the functionality to be checked based on predefined or dynamically determined criteria is indicated by block 238. The functionality can be a wide variety of different functionality, such as one or more tools 240, one or more bearings 242, or a wide variety of other functionality. This is indicated by block 244. It will be noted that tools and bearings are mentioned for the sake of example only, and a wide variety of other functionality can be checked. The particular type of functionality to be checked may depend on the implement 102 being used, or on other criteria.

Data store interaction logic 196 then determines the type of comparison that is to be performed in order to check the identified functionality for problems. In one example, as discussed above, logic 196 can access the comparison type indicator 202 in data store 166 based upon the identified functionality that is to be checked. Indicators 202 will indicate the type of comparison that is to be made so that logic 196 can obtain the reference characteristic for comparison from data store 166, if that is to be used. Identifying the type of comparison is indicated by block 246 in the flow diagram of FIG. 4. As discussed above, the type of comparison can be a comparison against a baseline characteristic as indicated by block 248. It can be a comparison against a threshold value 212, as indicated by block 250. It can be a real time (or near real time) comparison among operating units or groups on implement 102. This is indicated by block 252. It can be a wide variety of other types of comparison as well, and this is indicated by block 254.

Problem detection logic 164 then controls characteristic sensors 162 to obtain sensor signals that are real time (or near real time) values indicative of the sensed characteristics, or upon which the sensed characteristics can be derived. It provides those values to comparison logic 198. It also obtains the reference value for comparison and provides that to comparison logic 198. Obtaining the current characteristic for comparison from implement 102 is indicated by block 256 in FIG. 4 and obtaining the reference characteristic for comparison is indicated by block 258. Again, the reference characteristic for comparison can be a baseline characteristic 204, 206, 208 or 210, in which case data store interaction logic 196 obtains that baseline characteristic for comparison by comparison logic 198. The same can be done if the reference characteristic is a threshold value 212. Obtaining the reference characteristic for comparison from data store 166 is indicated by block 260. The reference characteristic for comparison can be a similar characteristic generated by a different working group (one that is not currently being tested). In that case, problem detection logic 164 controls characteristic sensors 162 to obtain that characteristics from the other working group. This is indicated by block 262 in the flow diagram of FIG. 4. The reference characteristic for comparison can be obtained in other ways as well, and this is indicated by block 264.

Once the real time (or near real time) characteristic is obtained for the functionality on implement 102 to be tested, from sensors 162, and once the reference characteristic for comparison is obtained, then comparison logic 198 performs a comparison. This is indicated by block 266 in the flow diagram of FIG. 4. It provides the result of the comparison to problem identifier logic 200 which determines whether the comparison indicates that the functionality of implement 102 that is currently being tested is exhibiting a problem. This is indicated by block 268. Again, as discussed above, this can be done by accessing a mapping between different comparison values and likely problems or sets of problems for implement 102, which may be stored in data store 166 or elsewhere. It can also be done by having a pre-generated model of the operation of implement 102 and applying the difference value (the result of the comparison) to that model. The model will then classify the difference to identify whether a problem exists, and, if so, the type of problem. The model may dynamically generate an output indicative of whether a problem exists, and the type of problem, in other ways as well. Determining whether there is a problem and, if so, identifying the problem, can be performed in a wide variety of other ways as well.

If, at block 268, problem identifier logic 200 determines that no problem exists, then operation skips to block 270 where functionality selector 172 determines whether there is any additional functionality on implement 102 that is to be tested at this time. If so, processing reverts to block 236 where that functionality is identified and checked. If not, then implement detection control system 150 determines whether the operation being performed by vehicle 100 and implement 102 is complete. This is indicated by 272. If not, processing reverts to block 234 where the system waits for trigger detector 170 to detect another trigger indicating that a problem check is to be performed.

If, at block 268, problem identifier logic 200 determines that there is a problem, based upon the comparison results output by comparison logic 198, then it provides the identity of the problem (or set of problems) to control signal generator 154. Control signal generator 154 generates action signals (or control signals) based upon the identified problem. This is indicated by block 274 in the flow diagram of FIG. 4. It then takes some action based on the action signals or control signals. For instance, it can apply the control signals to controllable subsystems 136, operator interface mechanisms 142, communication systems 140 or other items to take an action in order to address the identified problem. This is indicated by block 276. For example, it can apply control signals to controllable subsystems 136 on towing vehicle 100 in order to change the operation of vehicle 100 given the problem. By way of example, it may be that the problem is that a portion of implement 102 has broken so that the performance level of implement 102 will be highly deficient, or so that continued operation of implement 102 may result in further damage. In that case, control signals may control the propulsion system of vehicle 100 to stop vehicle 100 so that the problem can be fixed, in order to increase the performance level of implement 102 to an acceptable level, in order to avoid further damage to implement 102 or vehicle 100, or for other reasons. The control signals may control vehicle 102 to slow it down, to actuate various actuators, or to perform other actions. Controlling the towing vehicle 100 based on the identified problem is indicated by block 278.

The control signals may also be applied through links 114 (or communication system 140) to towed agricultural implement 102 in order to control various tools or functionality 132 on implement 102, based upon the identified problem. This is indicated by block 280.

The control signals may also control operator interface mechanisms 142. Mechanisms 142 can be controlled to alert operator 122 to the problem, to recommend actions to operator 122, to provide user input mechanisms that can be actuated by operator 122 in order to perform recommended actions (e.g., to stop vehicle 100, to reduce its speed, to decrease the depth of soil engagement of implement 102, etc.). Controlling operator interface mechanisms 142 is indicated by block 282 in the flow diagram of FIG. 4.

The control signals can be used to control communication systems 140 in order to communicate an indication of the problem to other items. For instance, communication system 140 can be controlled to communicate the problem to remote systems 124 where they can be stored, processed, or viewed by remote user 128. By way of example, where the problem identified is that a tool or other piece of functionality on implement 102 is broken, then communication system 140 can be controlled to communicate an indication of that to a remote system 124 at a vendor location, where a vendor can then dispatch a repair technician or a spare part, to the location of vehicle 100. This is just one example, and controlling communication systems 140 based on the identified problem can be performed in a wide variety of different ways. Controlling communication system 140 is indicated by block 284. The control signals can be output in a wide variety of other ways to control a wide variety of other functionality of towing vehicle 100, agricultural implement 102 or other items. This is indicated by block 286.

Processing then continues at block 270 where it is determined whether there is more functionality on implement 102 to check at this time and, if so, processing reverts to block 236. If not, it is determined whether the operation being performed by vehicle 100 and implement 102 is complete. If not, processing reverts to block 234. If so, then the processing is complete.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
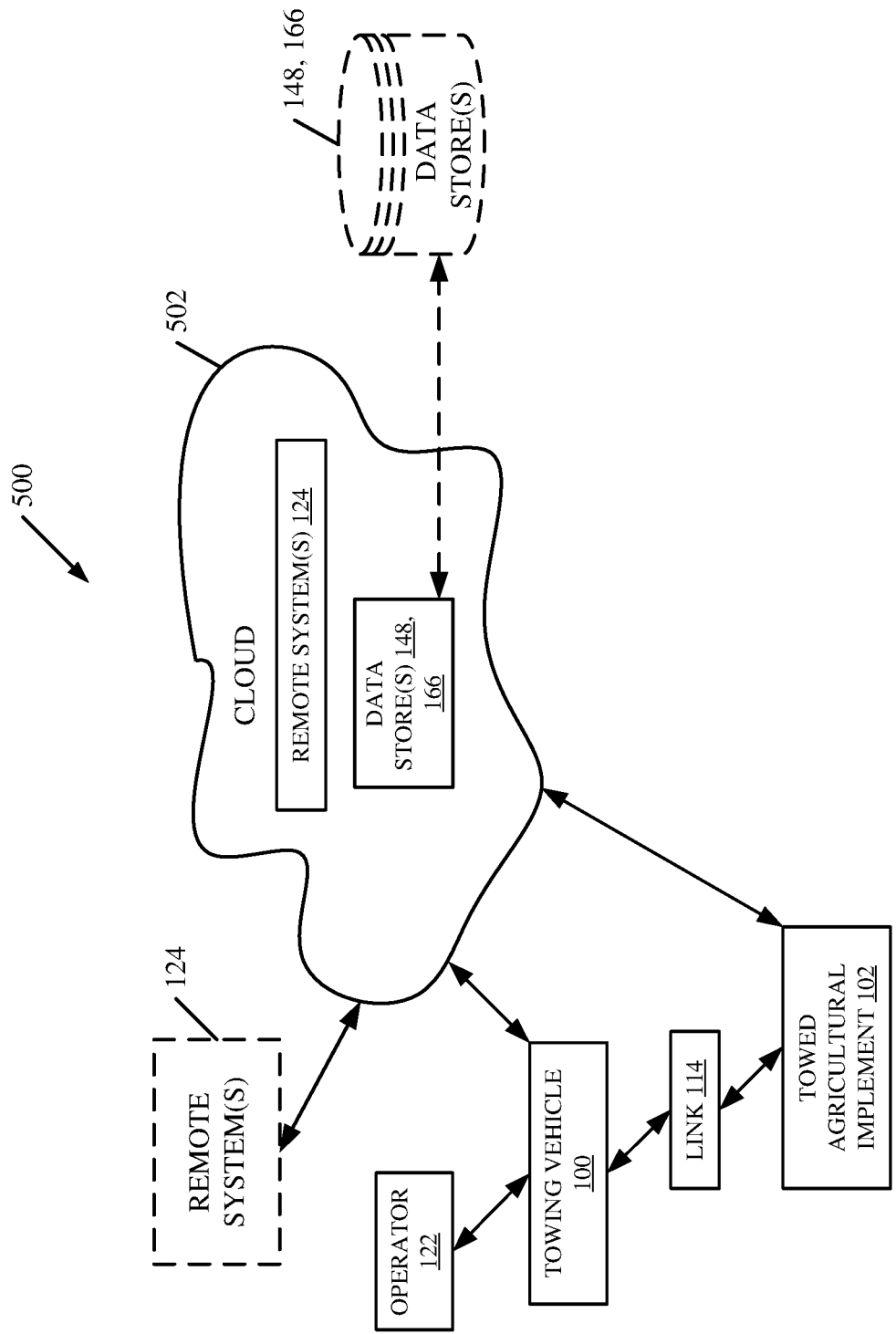
FIG. 5 is a block diagram showing one example of the architecture illustrated in FIG. 2, deployed in a remote server environment.

FIG. 5 is a block diagram of architecture 120, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that remote systems 124 and/or data stores 148, 166 can be located at a remote server location 502. Therefore, vehicle 100 and/or implement 102 accesses those systems through remote server location 502.

FIG. 5 also depicts another example of a remote server architecture. FIG. 5 shows that it is also contemplated that some elements of FIG. 2 are disposed at remote server location 502 while others are not. By way of example, storage 148, 166 or remote systems 124 can be disposed at a location separate from location 502, and accessed through the remote server at location 502. Regardless of where they are located, they can be accessed directly by vehicle 100 and/or implement 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the vehicle 100 comes close to the fuel truck for fueling, the system automatically collects the information from the vehicle 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the vehicle 100 until the vehicle 100 enters a covered location. The vehicle, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
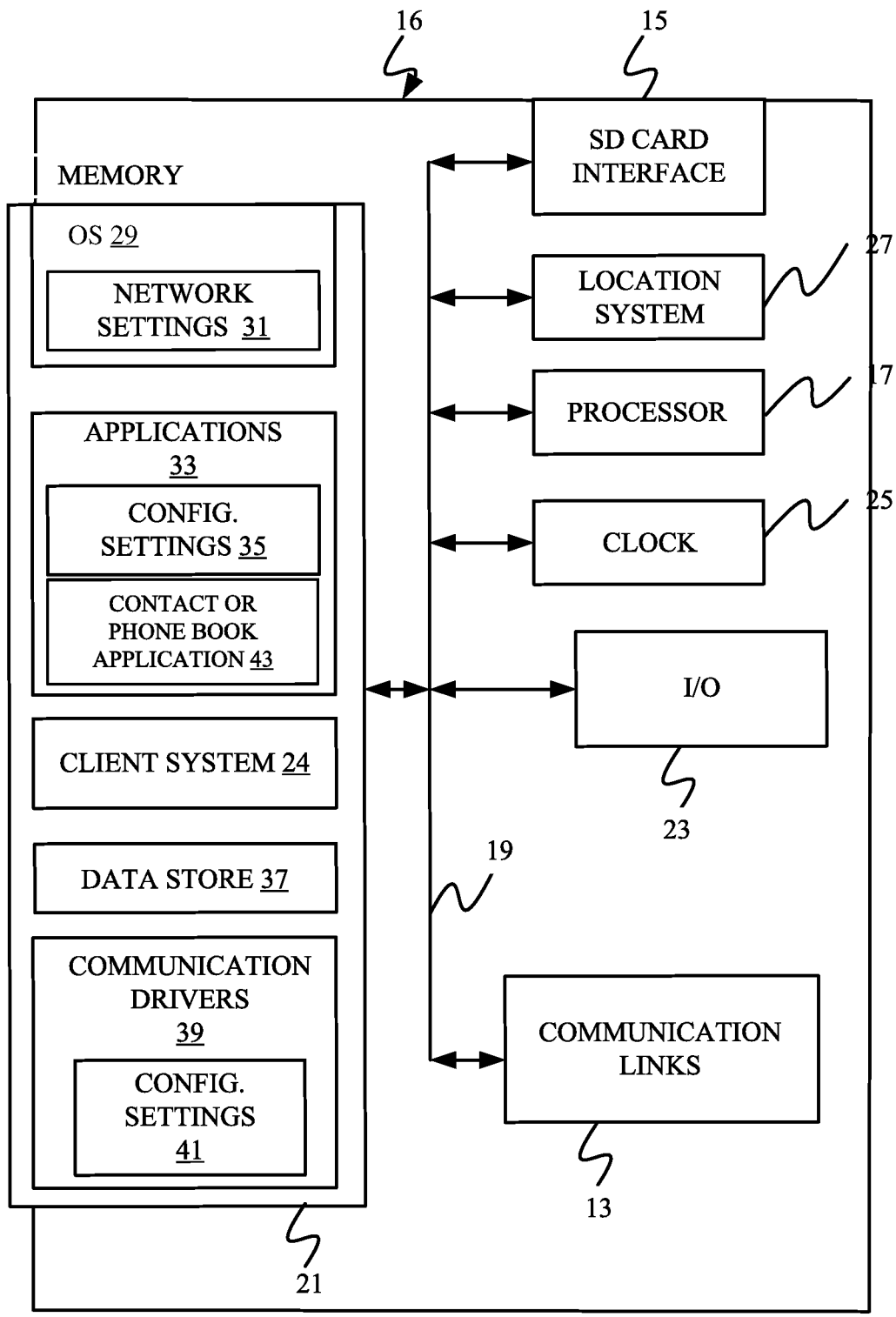
FIGS. 6-8 show examples of mobile devices that can be used in the architectures shown in the previous Figures.
Figure 7:
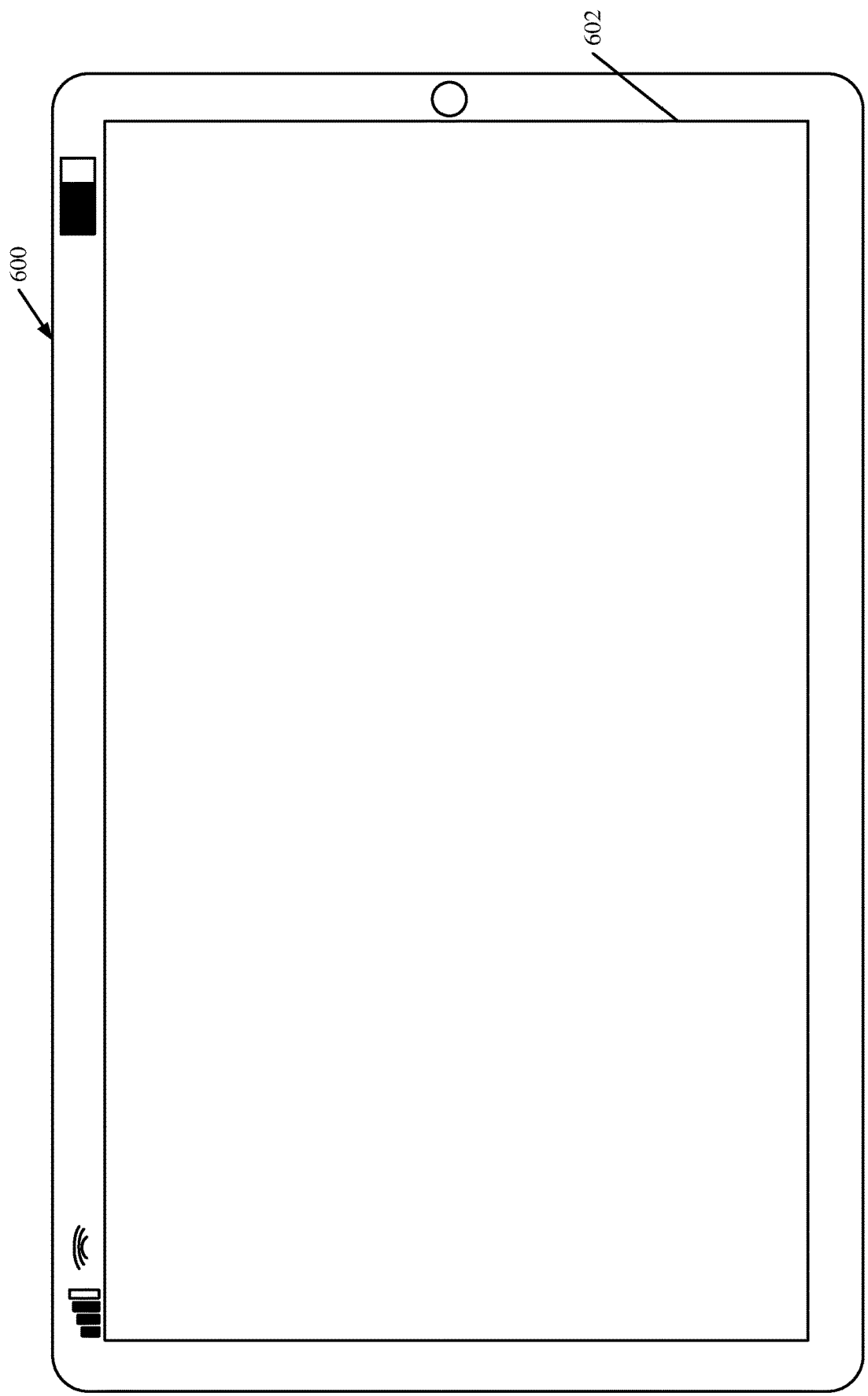
Figure 8:
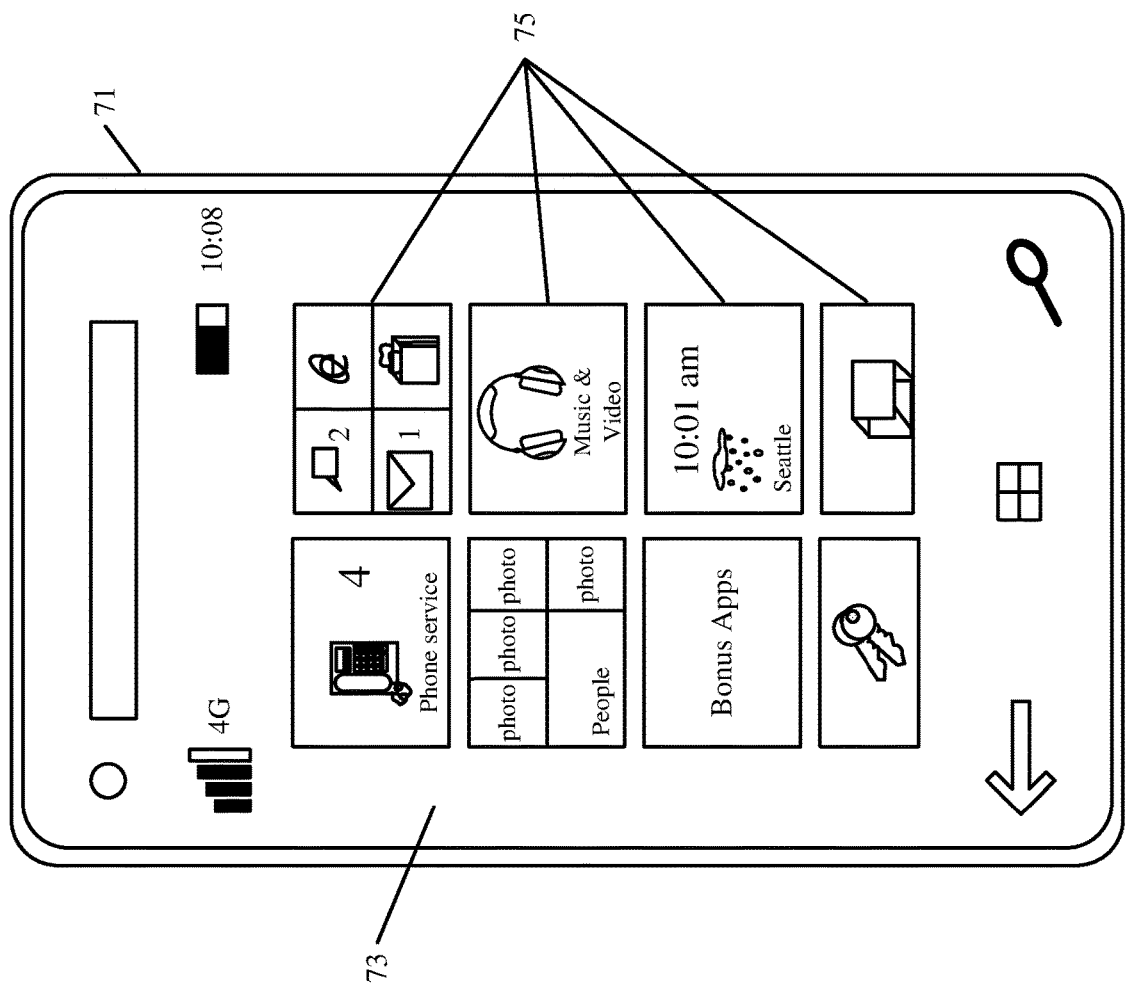

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of vehicle 100 for use in generating, processing, or displaying information and user interface mechanisms 142. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one examples in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
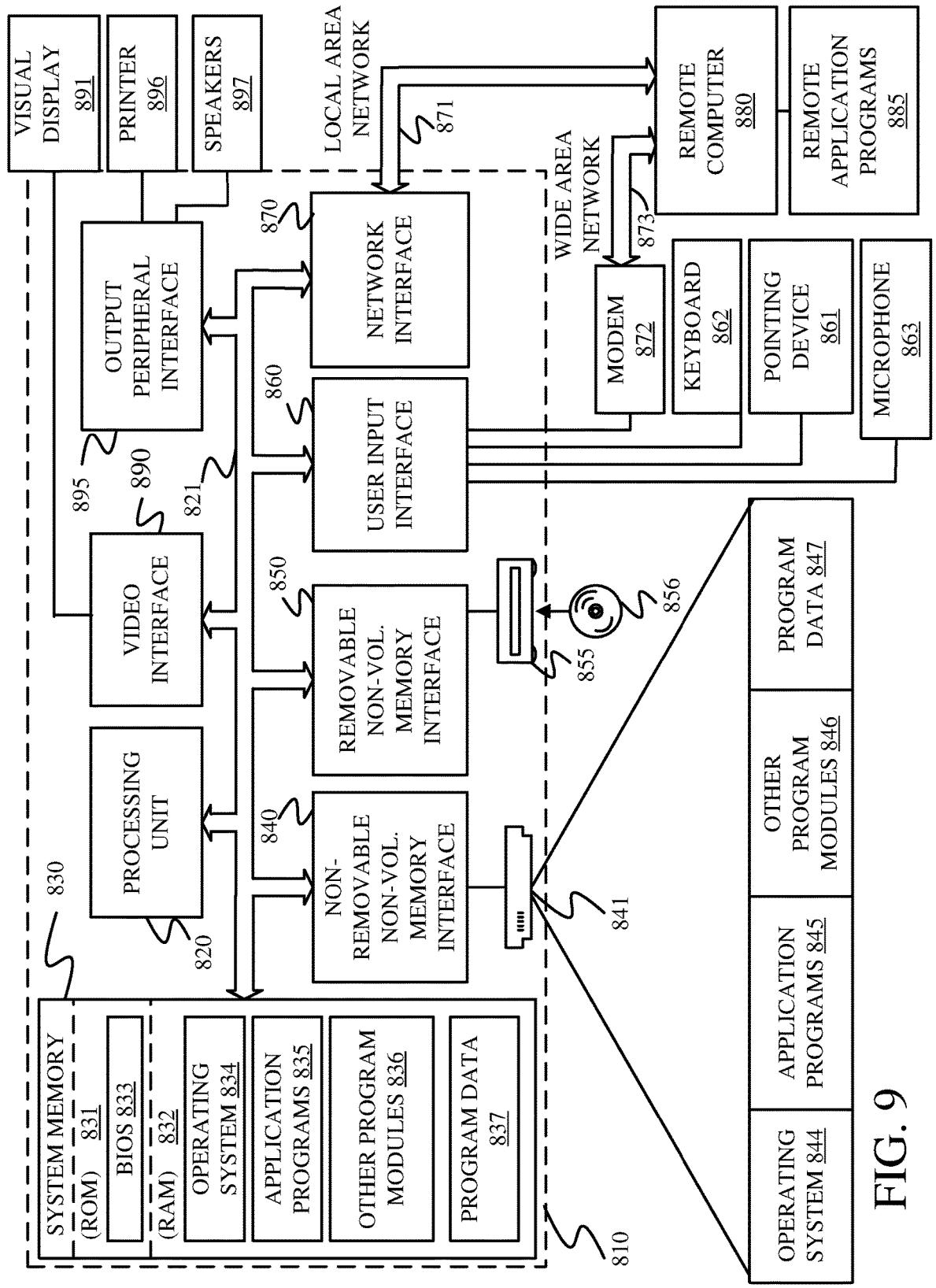
FIG. 9 is a block diagram showing one example of a computing environment that can be used in the architectures shown in the previous Figures.

FIG. 9 is one example of a computing environment in which elements of FIG. 2, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, a controller area network (CAN) bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using CAN, logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a towed agricultural implement control system, comprising:
  a non-visual electromagnetic (EM) radiation sensor that senses non-visual EM radiation to generate a sensor signal indicative of a sensed characteristic of the towed agricultural implement;
  comparison logic that compares the sensed characteristic to a reference characteristic and generates a comparison signal indicative of the comparison;
  problem identifier logic that identifies a problem on the towed agricultural implement based on the comparison signal and generates a problem identifier signal; and
  a control signal generator that generates a control signal to control a controllable subsystem based on the problem identifier signal.

Example 2 is the towed agricultural implement control system of any or all previous examples wherein the non-visual EM radiation sensor senses the sensed characteristic corresponding to a functional item on the towed agricultural implement.

Example 3 is the towed agricultural implement control system of any or all previous examples and further comprising:
  data store interaction logic configured to obtain, from a data store, a baseline non-visual EM characteristic, as the reference characteristic, based on a type of the functional item.

Example 4 is the towed agricultural implement control system of any or all previous examples wherein the data store interaction logic configured to obtain, from a data store, a threshold non-visual EM characteristic, as the reference characteristic, based on a type of the functional item.

Example 5 is the towed agricultural implement control system of any or all previous examples and further comprising:
  reference generator logic configured to control the non-visual EM sensor to generate the reference characteristic corresponding to the towed agricultural implement.

Example 6 is the towed agricultural implement control system of any or all previous examples wherein the towed agricultural implement has a plurality of similar functional items and wherein the comparison logic is configured to compare the sensed characteristic corresponding to a first of the plurality of similar functional items to a sensed characteristic corresponding to, as the reference characteristic, one or more other functional items in the plurality of similar functional items.

Example 7 is the towed agricultural implement control system of any or all previous examples wherein the non-visual EM radiation sensor comprises:
  an infra-red (IR) sensor that generates an IR signal indicative of a thermal image of the functional item on the towed agricultural item, as the sensed characteristic.

Example 8 is the towed agricultural implement control system of any or all previous examples wherein the comparison logic is configured to compare the thermal image of the functional item on the towed agricultural implement to a baseline thermal image of the functional item on the towed agricultural implement to generate the comparison signal.

Example 9 is the towed agricultural implement control system of any or all previous examples wherein the controllable subsystem comprises:
- a controllable element on the towed agricultural implement.

Example 10 is the towed agricultural implement control system of any or all previous examples wherein the controllable subsystem comprises:
- a controllable subsystem on the towing vehicle.

Example 11 is the towed agricultural implement control system of any or all previous examples wherein the controllable subsystem on the towing vehicle comprises a user interface mechanism.

Example 12 is a towed agricultural implement control system, comprising:
- an auditory sensor that senses an auditory characteristic of a towed agricultural implement to generate a sensor signal indicative of the sensed auditory characteristic of the towed agricultural implement;
- comparison logic that compares the sensed auditory characteristic to a reference auditory characteristic and generates a comparison signal indicative of the comparison;
- problem identifier logic that identifies a problem on the towed agricultural implement based on the comparison signal and generates a problem identifier signal; and
- a control signal generator that generates a control signal to control a controllable subsystem based on the problem identifier signal.

Example 13 is the towed agricultural implement control system of any or all previous examples and further comprising:
- data store interaction logic configured to obtain, from a data store, a baseline auditory characteristic generated by the towed agricultural implement, as the reference auditory characteristic.

Example 14 is the towed agricultural implement control system of any or all previous examples wherein the data store interaction logic configured to obtain, from a data store, a threshold auditory value, as the reference auditory characteristic.

Example 15 is the towed agricultural implement control system of any or all previous examples and further comprising:
- reference generator logic configured to control the auditory sensor to generate the reference auditory characteristic corresponding to the towed agricultural implement.

Example 16 is the towed agricultural implement control system of any or all previous examples wherein the controllable subsystem comprises at least one of a controllable element on the towed agricultural implement or a controllable subsystem on the towing vehicle.

Example 17 is a method of controlling a towed agricultural implement control system, comprising:
- controlling a non-visual electromagnetic (EM) radiation sensor, that senses non-visual EM radiation, to generate a sensor signal indicative of a sensed characteristic of the towed agricultural implement;
- comparing the sensed characteristic to a reference characteristic;
- generating a comparison signal indicative of the comparison;
- identifying a problem on the towed agricultural implement based on the comparison signal;
- generating a problem identifier signal; and
- generating an action signal based on the problem identifier signal.

Example 18 is the method of any or all previous examples and further comprising:
- obtaining, from a data store, a baseline non-visual EM characteristic, generated by the towed agricultural implement, as the reference characteristic.

Example 19 is the method of any or all previous examples and further comprising:
- controlling the non-visual EM sensor to generate the reference characteristic corresponding to the towed agricultural implement.

Example 20 is the method of any or all previous examples wherein the towed agricultural implement has a plurality of similar functional items, wherein the non-visual EM radiation sensor is configured to sense the sensed characteristic corresponding to a first of the plurality of similar functional items on the towed agricultural implement, and wherein comparing the sensed characteristic to a reference characteristic comprises:
- comparing the sensed characteristic corresponding to the first of the plurality of similar functional items to a sensed characteristic corresponding to, as the reference characteristic, one or more other functional items in the plurality of similar functional items.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A towed agricultural implement control system, comprising:
   a non-visual electromagnetic (EM) radiation sensor that senses non-visual EM radiation to generate a sensor signal indicative of a sensed characteristic of the towed agricultural implement;
   comparison logic that compares the sensed characteristic to a reference characteristic and generates a comparison signal indicative of the comparison;
   problem identifier logic that identifies a problem on the towed agricultural implement based on the comparison signal and generates a problem identifier signal; and
   a control signal generator that generates a control signal to control a controllable subsystem based on the problem identifier signal.

2. The towed agricultural implement control system of claim 1 wherein the non-visual EM radiation sensor senses the sensed characteristic corresponding to a functional item on the towed agricultural implement.

3. The towed agricultural implement control system of claim 2 and further comprising:
   data store interaction logic configured to obtain, from a data store, a baseline non-visual EM characteristic, as the reference characteristic, based on a type of the functional item.

4. The towed agricultural implement control system of claim 3 wherein the data store interaction logic is configured to obtain, from a data store, a threshold non-visual EM characteristic, as the reference characteristic, based on a type of the functional item.

5. The towed agricultural implement control system of claim 2 and further comprising:
reference generator logic configured to control the non-visual EM sensor to generate the reference characteristic corresponding to the towed agricultural implement.

6. The towed agricultural implement control system of claim 2 wherein the towed agricultural implement has a plurality of similar functional items and wherein the comparison logic is configured to compare the sensed characteristic corresponding to a first of the plurality of similar functional items to a sensed characteristic corresponding to, as the reference characteristic, one or more other functional items in the plurality of similar functional items.

7. The towed agricultural implement control system of claim 2 wherein the non-visual EM radiation sensor comprises:
an infra-red (IR) sensor that generates an IR signal indicative of a thermal image of the functional item on the towed agricultural item, as the sensed characteristic.

8. The towed agricultural implement control system of claim 7 wherein the comparison logic is configured to compare the thermal image of the functional item on the towed agricultural implement to a baseline thermal image of the functional item on the towed agricultural implement to generate the comparison signal.

9. The towed agricultural implement control system of claim 1 wherein the controllable subsystem comprises:
a controllable element on the towed agricultural implement.

10. The towed agricultural implement control system of claim 1 wherein the controllable subsystem comprises:
a controllable subsystem on the towing vehicle.

11. The towed agricultural implement control system of claim 1 wherein the controllable subsystem on the towing vehicle comprises a user interface mechanism.

12. A towed agricultural implement control system, comprising:
an auditory sensor that senses an auditory characteristic of a towed agricultural implement to generate a sensor signal indicative of the sensed auditory characteristic of the towed agricultural implement;
comparison logic that compares the sensed auditory characteristic to a reference auditory characteristic and generates a comparison signal indicative of the comparison;
problem identifier logic that identifies a problem on the towed agricultural implement based on the comparison signal and generates a problem identifier signal; and
a control signal generator that generates a control signal to control a controllable subsystem based on the problem identifier signal.

13. The towed agricultural implement control system of claim 12 and further comprising:
data store interaction logic configured to obtain, from a data store, a baseline auditory characteristic generated by the towed agricultural implement, as the reference auditory characteristic.

14. The towed agricultural implement control system of claim 13 wherein the data store interaction logic configured to obtain, from a data store, a threshold auditory value, as the reference auditory characteristic.

15. The towed agricultural implement control system of claim 12 and further comprising:
reference generator logic configured to control the auditory sensor to generate the reference auditory characteristic corresponding to the towed agricultural implement.

16. The towed agricultural implement control system of claim 12 wherein the controllable subsystem comprises at least one of a controllable element on the towed agricultural implement or a controllable subsystem on the towing vehicle.

17. A method of controlling a towed agricultural implement control system, comprising:
controlling a non-visual electromagnetic (EM) radiation sensor, that senses non-visual EM radiation, to generate a sensor signal indicative of a sensed characteristic of the towed agricultural implement;
comparing the sensed characteristic to a reference characteristic;
generating a comparison signal indicative of the comparison;
identifying a problem on the towed agricultural implement based on the comparison signal;
generating a problem identifier signal; and
generating an action signal based on the problem identifier signal.

18. The method of claim 17 and further comprising:
obtaining, from a data store, a baseline non-visual EM characteristic, generated by the towed agricultural implement, as the reference characteristic.

19. The method of claim 18 and further comprising:
controlling the non-visual EM sensor to generate the reference characteristic corresponding to the towed agricultural implement.

20. The method of claim 17 wherein the towed agricultural implement has a plurality of similar functional items, wherein the non-visual EM radiation sensor is configured to sense the sensed characteristic corresponding to a first of the plurality of similar functional items on the towed agricultural implement, and wherein comparing the sensed characteristic to a reference characteristic comprises:
comparing the sensed characteristic corresponding to the first of the plurality of similar functional items to a sensed characteristic corresponding to, as the reference characteristic, one or more other functional items in the plurality of similar functional items.

* * * * *